United States Patent

Schoofs

[11] Patent Number: 5,095,261
[45] Date of Patent: Mar. 10, 1992

[54] TRANSIENT PROTECTION CIRCUIT FOR A DC VOLTAGE SUPPLY

[75] Inventor: Franciscus A. C. M. Schoofs, Eindhoven, Netherlands

[73] Assignee: U.S. Philips Corporation, New York, N.Y.

[21] Appl. No.: 449,636

[22] Filed: Dec. 12, 1989

[30] Foreign Application Priority Data

Dec. 15, 1988 [GB] United Kingdom ............... 8829276

[51] Int. Cl.$^5$ ............................................. G05F 1/563
[52] U.S. Cl. .................................. 323/222; 323/224; 323/282; 361/18; 361/111
[58] Field of Search ............... 323/222, 223, 224, 282, 323/351; 361/18, 111

[56] References Cited

U.S. PATENT DOCUMENTS

| | | | |
|---|---|---|---|
| 3,793,535 | 2/1974 | Chowdhuri | 361/111 |
| 3,947,752 | 3/1976 | Morgan | 323/284 |
| 3,973,224 | 8/1976 | Gaule et al. | 361/111 |
| 4,016,461 | 4/1977 | Roland | 323/282 |
| 4,127,886 | 11/1978 | Easter | 361/18 |
| 4,288,831 | 9/1981 | Dolikian | 323/282 |
| 4,346,431 | 8/1982 | Steigerwald | 323/222 |
| 4,413,224 | 11/1983 | Krupka et al. | 323/222 |
| 4,491,903 | 1/1985 | Montague | 361/111 |
| 4,602,308 | 7/1986 | Montague | 361/111 |
| 4,672,300 | 6/1987 | Harper | 323/222 |
| 4,685,020 | 8/1987 | Driscoll et al. | 361/18 |
| 4,734,636 | 3/1988 | Stevens | 323/287 |
| 4,792,746 | 12/1988 | Josephson et al. | 323/290 |
| 4,958,121 | 9/1990 | Cuomo et al. | 323/224 |

FOREIGN PATENT DOCUMENTS 157668 6/1988 Japan .
274363 11/1988 Japan .

Primary Examiner—Jeffrey Sterrett
Attorney, Agent, or Firm—Bernard Franzblau

[57] ABSTRACT

A transient protection circuit for a d.c., voltage supply has a device such as a capacitor (C2) for absorbing transient energy developed on lines (11,12) of the supply. In order to provide such protection without loading the supply with a permanently connected large capacitor, the device for absorbing transient energy (C2) is indirectly connected in parallel with the supply lines (11,12) via a voltage responsive element (D1) which only conducts during the occurrence of a transient.

18 Claims, 1 Drawing Sheet

TRANSIENT PROTECTION CIRCUIT FOR A DC VOLTAGE SUPPLY

BACKGROUND OF THE INVENTION

This invention relates to a transient protection circuit for a d.c. voltage supply and to a switch mode power converter including a transient protection circuit.

There are many d.c. supply requirements where the occurrence of high voltage transients can be destructive to circuits powered therefrom. This is a particular problem in the case of semiconductor circuitry, especially when implemented by integrated circuitry. When the circuitry is fed from an alternating current supply after rectification and a large capacitor cannot be directly connected across the d.c. supply lines, the smoothing effect of such a capacitor is lost so that alternative means is required to reduce the effect of mains voltage fluctuations and transients. An example is the case of switched-mode power converters such as are used for power supplies in fluorescent lamp substitutes for incandescent light bulbs.

It is known to limit a d.c. supply voltage by means of a zener diode, a varistor, or a gas discharge element, but none of these devices can reduce the maximum clamped voltage to acceptable limits in the presence of a spurious transient.

SUMMARY OF THE INVENTION

An object of the present invention is to provide a solution to the before mentioned problems.

According to the invention there is provided a transient protection circuit for a d.c. voltage supply where the protection circuit comprises means for absorbing transient energy developed on the lines of the supply. The invention is characterized in that one of the supply lines is fed via a resistive element and the means for absorbing transient energy is indirectly connected in parallel with the supply lines via a voltage responsive element which conducts during the occurrence of a transient.

As the voltage responsive element conducts during the occurrence of the transient and is non-conductive thereafter, transient energy is diverted from the supply line and a transient voltage is dropped across the resistive element thereby stabilizing the supply line voltage.

The voltage responsive element may comprise a diode which is rendered conductive during the occurrence of a transient. The use of a diode provides a fast response time for the protection circuit.

The means for absorbing transient energy preferably comprises a capacitor. A resistor is preferably coupled in parallel with the capacitor to provide a discharge path for stored transient energy. The capacitor advantageously may be one employed in a further circuit which is fed from the d.c. supply lines so that the capacitor in addition to its role in the further circuit also acts as the means for absorbing transient energy.

According to another aspect of the invention a switched mode power supply is characterised by a protection circuit as previously defined. Preferably, one of the d.c. supply lines includes a series arrangement of an inductor followed by a diode feeding a capacitance coupled with the other supply line and switch means for repetitively coupling a point in the supply line between the inductor and the diode with the other supply line, and is characterised in that the voltage responsive element is arranged to bypass the inductor and the diode and that the capacitance of the series arrangement forms the means for absorbing transient current.

A switching transistor may be coupled in series in the d.c. supply line prior to the inductor so as to be biased to turn off within a predetermined time interval of the occurrence of a transient voltage.

The invention also encompasses a fluorescent lamp unit which includes in the combination of a fluorescent tube and a switch mode power converter as previously defined. These are preferably integrated in a housing which is equipped with a connector portion that permits removable electrical coupling with a socket for an incandescent light bulb. Alternatively, the switched-mode power converter may be provided in a socket or luminaire for receiving a removeable lamp.

BRIEF DESCRIPTION OF THE DRAWINGS

In order that the invention and its various other preferred features may be understood more easily, some embodiments thereof will now be described, by way of example only, with reference to the accompanying drawings in which.

DESCRIPTION OF THE PREFERRED EMBODIMENTS

Figure 1:
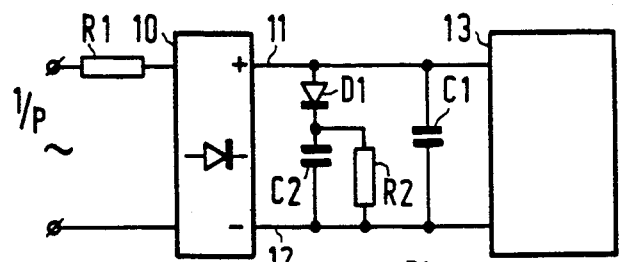
FIG. 1 is a partial block schematic diagram showing a dc power supply incorporating a basic transient protection circuit connected in accordance with the invention.

FIG. 1 shows a d.c. power supply unit which comprises a rectifier 10 having an input I/P for connection to an alternating current mains supply of 230 volts. The output of the rectifier is coupled via supply lines 11 and 12 to a circuit 13 which is to be powered therefrom. The circuit 13 has a capacitor C1 connected in parallel with its input, but this capacitance is of small value and inadequate to protect the circuit from substantial voltage fluctuations due to transients.

A transient protection circuit is formed by a series arrangement of a diode D1 and a capacitor C2 connected in series between the lines 11 and 12. A resistor R2 is connected in parallel with the capacitor C2 and a resistor R1 is connected in series with one of the input lines to the rectifier 10. It will be seen that the diode D1 is forward biased when the mains is connected so that an initial charging current is fed therethrough to the capacitor C2, whereupon the diode becomes non-conductive. Accordingly, C2 does not constitute a permanent load on the supply lines and is indirectly connected thereto.

When capacitor C2 is charged and under normal voltage supply conditions, the effective capacitive load across the supply line is small, constituted only by C1. However, when a transient occurs, diode D1 conducts and the capacitor C2 is connected in circuit. The resistor R1 and the capacitor C2 effectively form a filter for transient voltages in that a significant transient voltage drop occurs across R1 due to the absorption of the transient energy by C2, and the voltage between supply lines 11 whereby 12 is not significantly affected. The transient energy stored in the capacitor C2 is thereafter discharged via the resistor R2.

Figure 2:
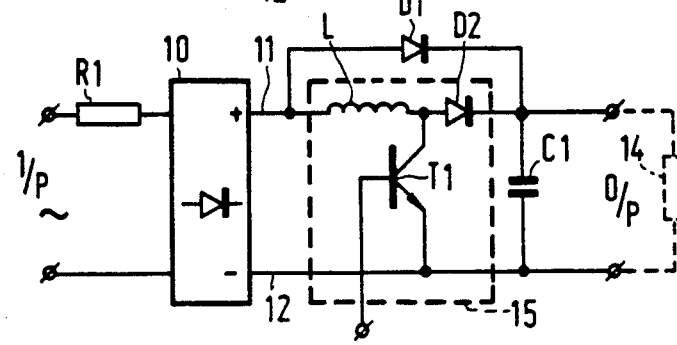
FIG. 2 is a schematic diagram of a switch mode power converter incorporating a transient protection circuit connected in accordance with the invention.

Referring now to FIG. 2, the circuit of FIG. 1 now incorporates a circuit to be protected which is constituted by a switch mode power converter for providing a stepped up voltage. The converter includes an inductor L connected in series with a diode D2 in the positive voltage supply line 11 from the output of the rectifier 10. The junction of the inductor L and the diode D2 is connected to the collector electrode of an NPN switching transistor T1, the emitter electrode of which is connected to the negative supply line 12. The base electrode of the transistor is connected to a cyclical switching voltage source (not shown) which causes a repetitive switching of the transistor on and off to induce a step-up voltage greater than the mains voltage in a known manner. The stepped up voltage is fed via output O/P to a load 14, for example, a d.c. to a.c. power converter and a fluorescent tube.

In FIG. 2 the diode D1 is arranged to bridge the series arrangement of the inductor L and the diode D2 to the capacitor C1, which was already present in the circuit and which now also constitutes the capacitor of the transient protection circuit. When a transient occurs on the mains, the transient voltage across the inductor L is limited due to a diversion of transient current via diode D1 to the capacitor and do to the voltage drop across resistor R1 and the inductor is not saturated.

Figure 3:
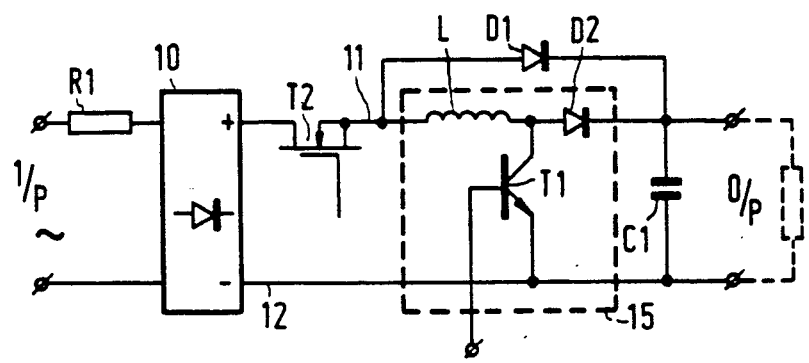
FIG. 3 is a refinement of the circuit of FIG. 2.

FIG. 3 incorporates a further refinement into the circuit of FIG. 2. In this circuit, the source-drain path of an insulated gate field effect transistor (IGFET) T2 is connected in the supply line 11. The gate electrode of the transistor T2 is connected to a suitable bias voltage (not shown) and the transistor is arranged to be turned off in response to a transient. This refinement is the subject of copending U.S. patent application Ser. No. 449,633 entitled Excess Voltage Protection Circuit, which was filed the same day as the present application, the whole contents of which are hereby imparted incorporated by reference.

Figure 4:
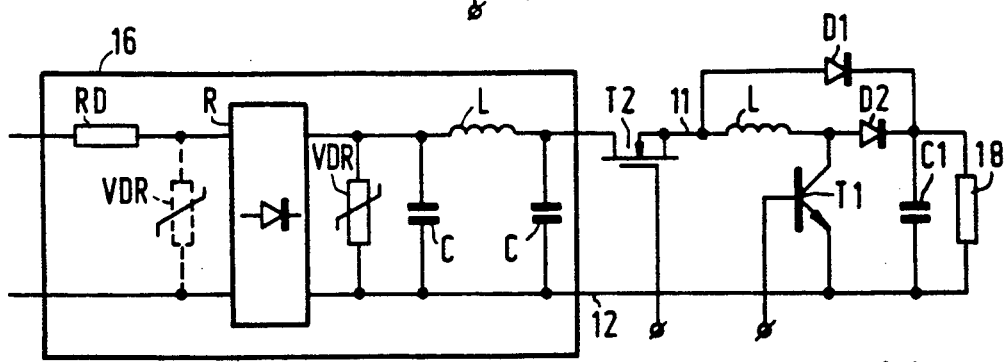
FIG. 4 is a partial block diagram showing a fluorescent lamp unit incorporating the circuit of FIG. 3.

The circuit of FIG. 4 shows a complete circuit, based on FIG. 3, and forming a fluorescent lamp drive circuit such as may be employed for compact integrated lamp units to replace incandescent bulbs in commercial and domestic premises.

Across the mains input there is connected a voltage clamp and rectifier circuit 16. The voltage clamp is formed by a series arrangement of a resistor RD and a voltage dependent resistor VDR. VDR may be connected in parallel with the output of the rectifier circuit R as shown in solid lines, or alternatively may be connected in parallel with the input of the rectifier circuit R as shown by dotted lines. The choice depends upon the relative prices of suitable protection components and the integration process. A partly smoothed voltage is developed across the resistor VDR and this voltage feeds the rectifier and filter circuit the output of which is connected to the supply lines 11 and 12 so as to ultimately power a load 18, containing a fluorescent tube, via the voltage step up circuit. In this arrangement all voltages, except for the drain voltage of T2, are limited relative to the voltage occurring across the VDR clamp. The delay introduced by the clamp 16 and by T2, D1 and C1 provides a longer delay between the occurrence of a transient and its appearance at the output than the turn of the transistor T2.

The operating conditions for the voltage clamp can be improved when this clamp is arranged behind the rectifier bridge (less degradation), which enables, for example, the voltage requirements imposed on the IC to be less stringent. This arrangement is also intended to fall within the scope of this invention. However, a drawback to this arrangement is that the rectifier bridge must now be capable of handling the transient current.

It should be appreciated that in applications such as cheap and small electronic ballasts the available storage capacity is small, for example, smaller than 10 microFarads and tens of milli-Henries for a saturating current Isat of less than one Ampere. The time necessary for turning off the series transistor T2 is dependent upon the value of the capacitor C1 required for sustaining the power supply around the zero crossing of the mains sine wave. The voltage output of the series transistor T2 increases only slowly because the inductor L is effectively by-passed by the diode D1, so that enough time is available to turn off the series transistor T2 before the voltage can reach an excessive value. Accordingly, dissipation in the series transistor is limited.

Figure 5:
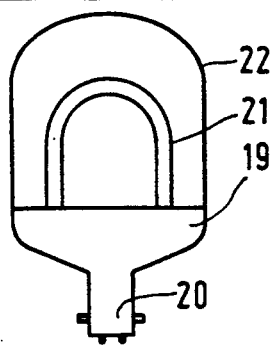
FIG. 5 is a side view of a fluorescent lamp unit which incorporates a transient protection circuit.

FIG. 5 shows the side view of a fluorescent lamp unit comprising a base 19 having a bayonet connector 20 for removable connection of the lamp in a socket such as is employed for incandescent bulbs. The base unit contains the circuitry such as described in relation to FIGS. 1 to 4 a fluorescent tube 21 forms a load for the circuit, which tube is contained within a housing 22.

I claim:
1. A switched mode power converter with transient protection comprising:
   a resistive element,
   first and second DC supply voltage lines wherein one of said supply lines receives its voltage via the resistive element,
   an inductor and a diode connected in series circuit between the first DC supply voltage line and a first output terminal of the converter,
   a switching transistor coupled between a circuit node in the series circuit and the second DC supply voltage line,
   means for coupling a control electrode of the switching transistor to a source of cyclical switching voltage, and
   a transient protection circuit including a capacitor for absorbing transient electric energy appearing on the DC supply voltage lines and a voltage responsive element for indirectly connecting the capacitor in parallel with the DC supply voltage lines, said voltage responsive element becoming conductive during the occurrence of an electric transient on a DC supply voltage line and independently of the level of DC voltage at said first output terminal.

2. A converter as claimed in claim 1, wherein
   said capacitor is coupled in series with said inductor and said diode across the DC supply voltage lines,
   said voltage responsive element is connected so as to provide a bypass circuit for the inductor and diode, and
   said circuit node comprises a circuit point between the inductor and the diode.

3. A converter as claimed in claim 1, further comprising a rectifier circuit having first and second output lines connected respectively to the first and second d.c. supply voltage lines and a pair of input lines for connection to an a.c. supply voltage source, wherein one of said input or output lines includes the resistive element.

4. A converter as claimed in claim 5, further comprising a voltage, clamp coupled across the output lines of the rectifier circuit.

5. A converter as claimed in claim 1 or further comprising a second switching transistor coupled in series with the first D.C. supply line prior to the inductor and biased to turn off within a predetermined time interval of the occurrence of a transient voltage.

6. A converter as claimed in claim 5, further comprising a voltage clamp coupled to the resistive element via a bidirectional current path.

7. A switched mode power converter with transient protection comprising:
a resistive element,
first and second DC supply voltage lines with one of said supply lines coupled to a voltage supply terminal via said resistive element,
an inductor and a diode connected in series circuit between the first DC supply voltage line and a first output terminal of the converter,
switching means connected to repetitively couple a circuit point on the first DC supply voltage line to the second DC supply voltage line,
a capacitor coupled to said first output terminal and to said second DC supply voltage line so as to receive energy via said series circuit, and
a transient protection circuit including means for absorbing transient energy appearing on a DC supply voltage line and a voltage responsive element for indirectly connecting the energy absorbing means in parallel with the DC supply voltage lines, said voltage responsive element becoming conductive during the occurrence of an electric transient on a DC supply voltage line.

8. A converter as claimed in claim 7 wherein said transient energy absorbing means includes said capacitor.

9. A converter as claimed in claim 8 wherein said voltage responsive element comprises a second diode coupled in parallel with said series circuit.

10. A converter as claimed in claim 9 further comprising a switching transistor coupled in series with the first DC supply voltage line prior to the inductor and controlled to turn-off within a given time interval after the occurrence of a transient voltage on a DC supply voltage line.

11. A converter as claimed in claim 10 further comprising a rectifier circuit having a pair of input lines for connection to a source of AC supply voltage and first and second output lines coupled to said first and second DC supply voltage lines, respectively, and wherein
one of said input or output lines includes the resistive element thereby to couple said one DC supply line to said voltage supply terminal.

12. A converter as claimed in claim 11 further comprising a voltage clamp coupled to one pair of said input or output lines of the rectifier circuit.

13. A converter as claimed in claim 7 wherein said transient energy absorbing means comprises a capacitance and said voltage responsive element comprises a second diode coupling said capacitance to said DC supply voltage lines when the second diode is forward biased by a voltage transient on a DC supply voltage line.

14. A converter as claimed in claim 13 wherein said switching means comprises a switching transistor, said circuit point is located between said inductor and the first diode, and the size of said capacitance is chosen to be sufficient to absorb a substantial portion of said transient energy.

15. A converter as claimed in claim 13 wherein said second diode is connected in parallel with said series circuit and in series with said resistive element.

16. A converter as claimed in claim 13 further comprising a switching transistor coupled in series with the first DC supply voltage line and controlled to turn-off within a given time interval after the occurrence of a transient voltage on a DC supply voltage line.

17. A converter as claimed in claim 13 wherein said energy absorbing capacitance includes said capacitor whereby said capacitor provides a dual function in the converter.

18. A converter as claimed in claim 7, further comprising a rectifier circuit having first and second output lines connected to the first and second D.C. supply lines, respectively, and a pair of input lines for connection an an a.c. supply source, wherein one of said input or output lines includes the resistive element, wherein said transient energy absorbing means comprises a capacitance and said voltage responsive element comprises a second diode connected in parallel with said series circuit.

* * * * *

UNITED STATES PATENT AND TRADEMARK OFFICE
CERTIFICATE OF CORRECTION

PATENT NO. : 5,095,261

DATED : March 10, 1992

INVENTOR(S) : Francisus A.C.M. Schoofs

It is certified that error appears in the above-identified patent and that said Letters Patent is hereby corrected as shown below:

Claim 3, line 5 change "an" to "a sinusoidal".
Claim 4, line 1 change "claim 5" to "claim 3".
Claim 5, line 1 delete "or".

Signed and Sealed this

Tenth Day of March, 1998

Attest:

BRUCE LEHMAN

*Attesting Officer*  *Commissioner of Patents and Trademarks*